US009863242B2

(12) United States Patent
Ferrara et al.

(10) Patent No.: US 9,863,242 B2
(45) Date of Patent: Jan. 9, 2018

(54) METHOD FOR REVEALING ANOMALOUS DISCONTINUITY INTERFACES IN PORE PRESSURES IN NON-DRILLED GEOLOGICAL FORMATIONS AND A SYSTEM IMPLEMENTING IT

(71) Applicant: ENI S.p.A., Rome (IT)

(72) Inventors: Paolo Ferrara, Milan (IT); Axel Turolla, Villafranca Padovana (IT); Massimo Zampato, Salzano (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 14/761,168

(22) PCT Filed: Jan. 14, 2014

(86) PCT No.: PCT/IB2014/058256
§ 371 (c)(1),
(2) Date: Jul. 15, 2015

(87) PCT Pub. No.: WO2014/111846
PCT Pub. Date: Jul. 24, 2014

(65) Prior Publication Data
US 2015/0361790 A1    Dec. 17, 2015

(30) Foreign Application Priority Data

Jan. 16, 2013    (IT) .............................. MI2013A0053

(51) Int. Cl.
*G01V 1/48*    (2006.01)
*E21B 49/00*    (2006.01)
(Continued)

(52) U.S. Cl.
CPC ............ *E21B 49/006* (2013.01); *E21B 10/00* (2013.01); *E21B 10/42* (2013.01);
(Continued)

(58) Field of Classification Search
CPC ........ E21B 47/06; E21B 49/006; E21B 10/00; E21B 47/02208; E21B 10/42; G01V 1/48; H04R 17/00
(Continued)

(56) References Cited

U.S. PATENT DOCUMENTS 2,651,027 A * 9/1953 Vogel ....................... G01V 1/52
181/102
4,850,449 A * 7/1989 Cheung ................. B06B 1/0607
181/101
(Continued)

FOREIGN PATENT DOCUMENTS

CN        1432135 A    7/2003

OTHER PUBLICATIONS

International Search Report dated Mar. 27, 2014 in European Patent Application No. PCT/IB2014/058256.
(Continued)

*Primary Examiner* — Daniel L Murphy
(74) *Attorney, Agent, or Firm* — Oblon, McClelland, Maier & Neustadt, L.L.P.

(57) ABSTRACT

A method for revealing anomalous discontinuity interfaces in pore pressures in non-drilled geological formations and an implementing system. The method includes generating, by an electroacoustic transducer, first pressure sound waves and receiving a reflected signal of such first pressure sound waves generated by at least one discontinuity interface due to passage from first to second different geological formations situated successively along an emission direction of the electroacoustic transducer; calculating speed of the first pressure sound waves generated and distance between the electroacoustic transducer and the at least one discontinuity interface; generating, by the electroacoustic transducer, second pressure sound waves and revealing the electrical
(Continued)

impedance induced at terminals of the electroacoustic transducer; estimating, based on the electrical impedance revealed, plural parameters characteristic of the first and second geological formation; estimating pressure of the second geological formation based on the sound speed and distance calculated and the plural characteristic parameters estimated.

11 Claims, 4 Drawing Sheets

(51) Int. Cl.
    *E21B 47/06*       (2012.01)
    *E21B 10/00*       (2006.01)
    *E21B 10/42*       (2006.01)
    *H04R 17/00*      (2006.01)
    *E21B 47/022*     (2012.01)

(52) U.S. Cl.
    CPC ........ *E21B 47/02208* (2013.01); *E21B 47/06* (2013.01); *G01V 1/48* (2013.01); *H04R 17/00* (2013.01)

(58) Field of Classification Search
    USPC ................................................ 367/25, 35, 32
    See application file for complete search history.

(56) References Cited

U.S. PATENT DOCUMENTS

| | | | | |
|---|---|---|---|---|
| 6,029,113 | A * | 2/2000 | Woodall | G01V 1/186 702/1 |
| 6,686,098 | B2 * | 2/2004 | Czech | B82Y 10/00 430/5 |
| 7,392,857 | B1 | 7/2008 | Hall et al. | |
| 2006/0175057 | A1 | 8/2006 | Mandal et al. | |
| 2007/0114062 | A1 | 5/2007 | Hall et al. | |
| 2010/0118657 | A1 | 5/2010 | Trinh et al. | |
| 2012/0031669 | A1 | 2/2012 | Foster | |

OTHER PUBLICATIONS

Combined Chinese Office Action and Search Report dated Jun. 9, 2017 in Patent Application No. 201480011656.1 (with English Translation).

* cited by examiner

METHOD FOR REVEALING ANOMALOUS DISCONTINUITY INTERFACES IN PORE PRESSURES IN NON-DRILLED GEOLOGICAL FORMATIONS AND A SYSTEM IMPLEMENTING IT

The present invention refers to a method for revealing anomalous discontinuity interfaces in pore pressures in non-drilled geological formations and to a system implementing it.

In order to avoid dangerous events of uncontrolled release of hydrocarbons from extraction wells also called blowout it is important to have a prediction of what the bit will encounter during the drilling in terms of pore pressures of the geological formations that still have to be drilled by the bit during the drilling operations of an oil well.

The possibility of identifying the position of an anomalous discontinuity interface in pore pressures indeed makes it possible to adopt a series of preventive measures so as to prevent blowout situations from being triggered.

Such a prediction is particularly useful in the case of scenarios in which the formation has low permeability (10-100 microDarcy) such as to not allow a direct measurement of the pressure at the pores.

The solution currently used is that of estimating the pressures pre-emptively with respect to the drilling operations, through reflectometry seismic methods so as to identify the trends of such pressures at a resolution in the order of tens of meters.

Subsequently, the estimated trends are possibly recalibrated as a function of the depth of the well, with local measurements in the well (sound speed, resistivity, gamma ray, density and so on) carried out during the drilling. In such a way also an improvement in the lateral resolution of the pressure trends is obtained.

The mathematical models used nowadays for processing the measurements and the definition of the trends of pore pressures of formations are estimation models that do not make it possible to predict anomalous pressures, possibly present in the formations still to be drilled, in particular if the lithology of such formations has rapid variations with respect to the formation beside the bit and/or if geopressure is caused by phenomena that cannot be attributed to under-compaction.

The purpose of the present invention is that of avoiding the drawbacks mentioned above and in particular that of devising a method for identifying anomalous discontinuity interfaces in pore pressures in non-drilled geological formations that makes it possible to obtain a prediction of anomalous pressure at some meters depth in the formations still to be drilled in front of the bit.

Another purpose of the present invention is that of providing a method for revealing anomalous discontinuity interfaces in pore pressures in non-drilled geological formations that provides a prediction resolution of the pressures in the order of the meter.

A further purpose of the present invention is that of making a system for revealing anomalous discontinuity interfaces in pore pressures in non-drilled geological formations that is capable of carrying out measurements directly in front of the bit.

These and other purposes according to the present invention are achieved by making a method for revealing anomalous discontinuity interfaces in pore pressures in non-drilled geological formations.

These and yet other purposes are obtained with the system for revealing anomalous discontinuity interfaces in pore pressures in non-drilled geological formations.

The characteristics and the advantages of a method for identifying anomalous discontinuity interfaces in pore pressures in non-drilled geological formations according to the present invention shall become clearer from the following description, given as an example and not for limiting purposes, with reference to the attached schematic drawings, in which.

Figure 1A:
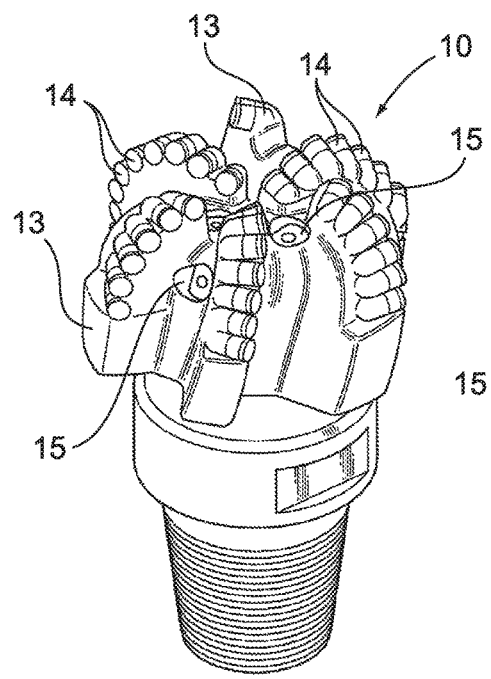
FIGS. 1A and 1B are a perspective view and a plan view, respectively, of one preferred but not limiting embodiment of a system for identifying anomalous discontinuity interfaces in pore pressures in non-drilled geological formations according to the present invention.

With reference to the figures, these show a system for revealing anomalous discontinuity interfaces in pore pressures in non-drilled geological formations, overall indicated with reference numeral 100.

The system 100 for revealing anomalous discontinuity interfaces in pore pressures in non-drilled geological formations comprises a bit 10 for drilling the formation in which, according to the present invention, an electroacoustic transducer 20 is integrated.

The electroacoustic transducer 20 is connected to an electronic processing unit 30 that is suitable for power supply, generating pilot signals and processing the data revealed by the transducer 20.

For such a purpose the electronic processing unit 30 comprises a generator of the pilot signal 31, means for power supply 32 and means for acquiring and processing the data 33.

The means for acquiring and processing the data 33 thus comprise software means (not illustrated) for implementing the method 200 for revealing anomalous discontinuity interfaces in pore pressures in non-drilled geological formations according to the present invention.

The electroacoustic transducer 20 comprises a transmitter 21 and a receiver 22 each provided with a specific piezoelectric transducer 29,35 respectively connected to driving means 34 of the piezoelectric transducer 35 for generating sound waves, also called transmitting transducer, and analogical conditioning means 27 of the signal received from the piezoelectric transducer 29 for receiving sound waves, also called receiving transducer.

The analogical conditioning means 27 of the received signal preferably comprise a first automatic gain control circuit 27a, a subtractor circuit 27b, a second automatic gain control circuit 27c, a multiplier circuit 27d and a low-pass filter 27e, cascade-connected.

In particular, the bit 10 comprises at least one drilling side 12 from which the electroacoustic transducer 20 extends, the electroacoustic transducer 20 thus having its axis A that is substantially orthogonal to the drilling side 12.

Preferably, the bit 10 is of the PDC (Polycrystalline Diamond Composite) type comprising at least one drilling side 12 a plurality of ridges 13 on which cutting means 14 are positioned, preferably of the diamond type.

In the central part of the drilling side 12 of the bit 10 it is moreover provided a plurality of injectors 15, also called duse injectors, for the passage of the drilling mud.

The electroacoustic transducer 20 is preferably positioned in the bit 10 so as to extend from the drilling side 12 exploiting the space between ridges 13 and avoiding the central part of the face 12, where there are the injectors 15.

The housing of the electroacoustic transducer 20 in the bit 10 imposes a constraint on the dimensions of the transducer 20, particularly of the radiating and receiving surfaces thereof, which must have a diameter in the order of a few centimeters.

Figure 1B:
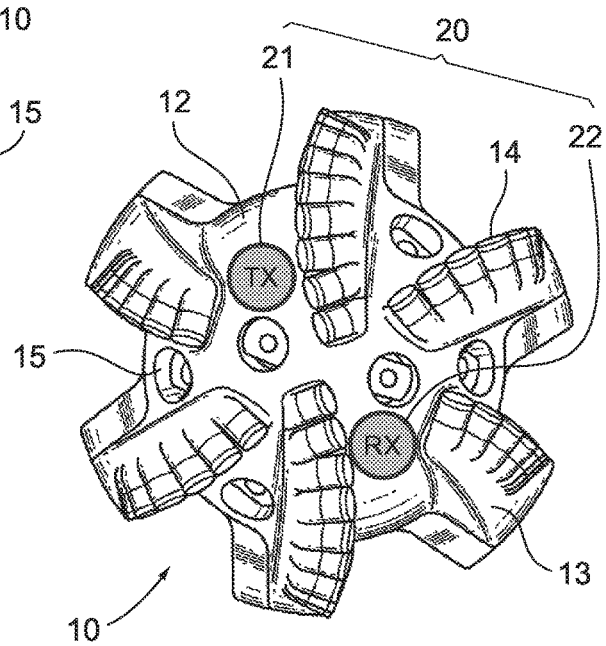

According to the preferred embodiment illustrated in FIGS. 1A and 1B, the transmitter 21 and the receiver 22 are housed separately in the middle of the ridges 13, preferably at a distance that is not greater than 6-7 cm, so as to allow the drilling mud to pass between the two elements 21, 22.

In one alternative embodiment that is not illustrated, the transmitter 21 and the receiver 22 are positioned in a cylindrical housing, preferably with a diameter that is not greater than 6-7 cm.

In order to reveal anomalous discontinuity interfaces in pore pressures in non-drilled geological formations, the electroacoustic transducer 20 must satisfy some requisites including:

operating in a band between a few hundreds Hz and a few kHz;

radiating the power necessary in order to penetrate the formation by a depth of around 10 m;

minimising the crosstalk between the transmitter 21 and the receiver 22.

The necessity of simultaneously satisfying such requisites, in addition to the size constraints imposed on the electroacoustic transducer 20 by the particular housing requirements dictated by the specific application, make the selection of the piezoelectric transducers 29, 35 that can be used for making the transmitter 21 and receiver 22 an operation that is quite important.

The relatively low frequencies at which the electroacoustic transducer 20 operates cause a high inefficiency in the process of transferring mechanical power from the radiating surface of the transmitting transducer 35, or source, to the formation.

Concerning this it is worth noting that the so called "radiation impedance" $Z_{rad}$, i.e. the ratio between the force exerted by the transmitting transducer 35 and the rate at which it oscillates, depends upon the interaction between the source 35 and the formation.

More precisely it can be expressed as $$Z_{rad} = A(Z_A z_{rad} + B)$$

where $Z_A$ is a scalar considered as the ratio between the wave pressure and its particle velocity in absence of a source (plane wave propagation), depending only upon the acoustic and geometrical properties of the formation;

A is the area of the radiating surface;

$z_{rad}$ (normalised radiation impedance) is a corrective term that considers the dimensions of the source (diameter D) with respect to the wave length λ in the formation (inversely proportional to the working frequency), equal to $$z_{rad} = r_{rad} + jx_{rad} = 1 - \frac{J_1(2ka)}{ka} + j\frac{K_1(2ka)}{2k^2a^2}$$

B is the impedance representing the elastic coupling effects between source and formation and it can be expressed as:

$$B = -j\frac{2E}{kv(1-v^2)\pi a}$$

wherein:

J1( ) is the Bessel function of the first kind;

K1( ) is the Struve function;

v is the sound speed in the formation;

k=2π/λ=ω/v is the wave number in the formation;

E is the elastic modulus of the formation;

ν is the Poisson coefficient of the formation;

a is the radius of the circular surface of the source. With the dimensions and the band of frequencies available for the specific application, in which the wavelength is around 100 times greater than the diameter of the radiating surface of the transmitting transducer 35, consequently leading to ka~0.03, the part of resistive impedance $r_{rad}$ seen from the transducer 20 is around 2 orders of magnitude smaller with respect to the part of reactive impedance $x_{rad}$.

Therefore, the radiation impedance Zrad is mostly reactive, or rather, only a small portion of the power injected into the source 35 is dissipated as radiated acoustic power.

The radiated acoustic power is equal to $$P_{rad} = \frac{|F|^2}{2R_{rad}} = \frac{|U|^2|Z_{rad}|^2}{2R_{rad}} = \frac{\omega^2 X^2 |Z_{rad}|^2}{2R_{rad}} = \frac{\omega^2 X^2 A^2 |Z_A z_{rad} + B|^2}{2\text{Re}(Z_A z_{rad})}$$

where A is the area of the radiating surface, $R_{rad}$ is the real part of $Z_{rad}$, X is the real phasor of the displacement of the source in the axial direction defined as $\xi(t)=X\sin(\omega t)$, U is the phasor of the particle velocity of the radiating surface, with modulus $|U|=\omega X$, whereas F is the phasor of the force exerted by the source on the formation, with modulus $|F|=|UZ_{rad}|=\omega X|Z_{rad}|$.

Since it is not possible to increase the radiating surface due to the size constraints outlined above, it is necessary to increase the maximum displacement X of the source 35.

Therefore, in order to obtain a certain radiated power $P_{target}$, it is necessary for the source to have a displacement equal to $$X_{target} = \frac{1}{\omega}\sqrt{\frac{2P_{target}R_{rad}}{|Z_{rad}|^2}}.$$

Theoretically, the intrinsic resonance frequency of the transmitting transducer 35 would thus be positioned below the working band, so that possible harmonics of the useful signal are outside of the area of the resonance frequency, where the sensitivity of the transmitter 21 is greater.

In such a way the amount of possible harmonic distortion would be minimised.

However, the size constraints that are characteristic of the specific application make it almost impossible to make a resonating system below 500 Hz.

The resonance frequency must therefore be above the working band. Anyway such a frequency should not be too high, since the voltage response of the transmitting transducer 35 decreases by 12 dB per octave before the resonance frequency.

Finally, the vicinity between source 35 and receiving transducer 29 makes the system suffer from crosstalk, or rather the signal that propagates from the source 35 to the receiving transducer 29 through the structure of the bit 10, tends to disturb or even "hide" the useful signal containing information on the geometry and on the acoustic properties of the formation.

Figure 2:
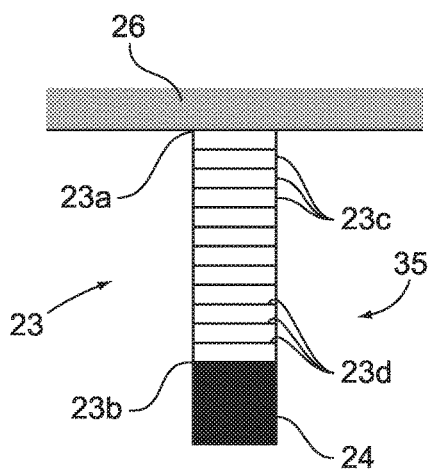
FIG. 2 is a schematic view of one preferred but not limiting embodiment of an electroacoustic transmitter used in the system according to the present invention.

In consideration of what has been described above, it is particularly appropriate to use a transmitting transducer 35 of the transmission line or "sandwich" type like for example illustrated in FIG. 2.

The transmission line transmitting transducer 35 comprises a stack 23 of ceramic layers 23c that are provided with corresponding metal electrodes 23d.

For the purposes of the specific application according to the invention, the stack 23 of ceramic layers 23c is constrained at a first end 23a to a fixed support 26 and at a second end 23b to a mass 24 that is suitable for reducing the intrinsic resonance frequency of the transmitting transducer 35 and partially adapting the mechanical impedance of the rock formation to that of the ceramic stack 23 so as to maximise the radiated power.

In such a way the first end 23a is blocked and the entire displacement is available towards the second free end 23b.

Preferably, the ceramic stack 23 is a monolithic multi-layer actuator of the PZT4D type.

One non limiting embodiment that is particularly suitable for the particular application provides for a ceramic stack 23 with a length equal to around 10-20 cm, where each ceramic disc 23c is enclosed between electrodes that are obtained through chemical deposition on the ceramic and has a thickness in the order of a few tens of microns.

The mass 24 on the second free end is preferably made in steel.

According to the preferred embodiment, such a mass 24 has a thickness equal to a few centimeters and a diameter such as to exploit the space available inside the bit 10, for example of around 3 cm.

The mass 24 preferably ends with a layer of material for being adapted to the formation, for example polyurethane, with a thickness equal to a few millimeters so as to further improve the coupling with the formation.

Advantageously, a transmission line transmitting transducer 35 of this kind makes it possible to obtain:
   a displacement in the order of a few tens of microns, that is sufficient so as to ensure enough radiated acoustic power in the band of interest, such as to penetrate a typical porous formation by at least 10 m;
   a resonance frequency slightly above the band of interest (comprised between a few hundreds of Hz and a few KHz).

In an alternative embodiment not shown, the transmitting transducer 35 is of the "tonpilz" type i.e. comprising a stack of ceramic layers that is provided with corresponding metal electrodes, that are compressed between two end masses.

The end masses are selected so as to ensure that the end facing inside the bit 10 has zero velocity, so that all the displacement is available towards the end facing outwards, or rather towards the formation.

Such an alternative embodiment of the transmitting transducer 35 is less preferable with respect to the transmission line embodiment due to the size constraints due to the necessity of housing the electroacoustic transducer 20 inside the bit 10.

Indeed, for the purpose of a correct operation it is necessary for every mass to have a thickness that is equal to a quarter of the wave length at the resonance frequency. Considering an example value of resonance frequency equal to 3 kHz, a mass of steel must have a length equal to around 40 cm, thus making it quite difficult for it to be housed inside the bit 10.

Figure 3:
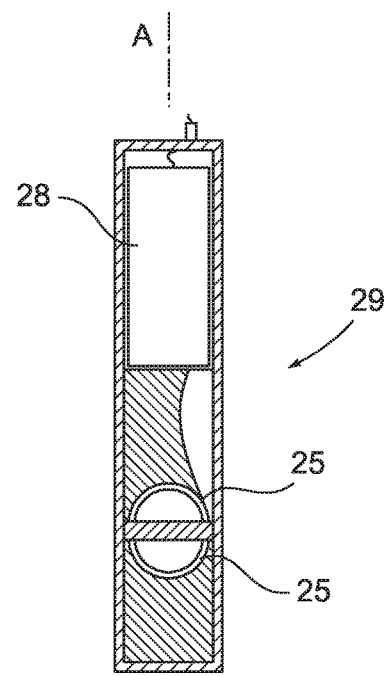
FIG. 3 is a schematic view of a preferred but not limiting embodiment of an electroacoustic receiver used in the system according to the present invention.

In order to minimise crosstalk between the transmitting transducer 35 and the receiving transducer 29, it is particularly suitable to use, as receiving transducer 29, a hydrophone of the "acceleration balanced" type containing two ceramic semi-spheres 25 immersed in oil as for example illustrated in FIG. 3.

Preferably the two ceramic semi-spheres 25 are of the PZT5A type.

The acceleration balanced hydrophone 29 makes it possible to attenuate by around 30-40 dB the sound signal coming from a direction that is different from the parallel to the axis A' of the hydrophone 29, indeed like acoustic crosstalk that propagates from the transmitting transducer 35 to the receiving transducer 29 directly through the structure of the bit 10.

Electronic processing means 28 are preferably provided integrated inside the hydrophone 29 for a preamplification of the signal received suitable for appropriately increasing the level of the signal before the transmission towards the electronic processing unit and for minimising the output impedance of the hydrophone 29.

In the rest of the description we shall outline a quantitative estimation of the performance of the source and receiver object of the present invention. Such an estimation is significantly described by the SNR (Signal to Noise Ratio).

The first element part of the calculation of the SNR is the level of force exerted by the transducer on the formation, which can reasonably reach the value of 1000 Nrms. The working frequency considered is equal to 1.5 kHz. In one purely elastic formation, the level of radiated acoustic pressure at 8 m depth would be around 117 dBSPL, i.e. 117 dB above a standard value of 20 μPa, which represents the minimum audibility threshold in air (as a reference example, this level could be considered similar to the noise produced by a chainsaw).

The second element that is part of the SNR calculation is the attenuation of the transmission channel and the reception after reflection on the formation.

However, the majority of rocks of interest in the field of application of the present patent (for example shales) have a poroelastic behaviour, i.e. viscoelastic, that strongly attenuates sound. A typical attenuation value can be 3 dB/m @ 1.5 kHz. Therefore, after 8 m the level of radiated sound pressure drops by 24 dB.

In order to obtain the level of sound pressure that reaches the receiver it is necessary to subtract the following:
   24 dB, considering 8 m of propagation from a possible interface in the formation to the receiver, 10 dB, considering that in a real lithology it is difficult for there to be almost total reflections (i.e. it is presumed that there is scattering, due to rugosity, and that the surface is partially Lambertian), 6 dB, considering the geometrical factor due to the spherical propagation, obtaining an overall attenuation of −64 dB.

The third element that is part of the SNR calculation is the sensitivity of the receiver.

At the frequency of 1.5 kHz, a typical hydrophone is characterised by:

a sensitivity of around −200 dBV re 1 μPa, corresponding to −174 dBV re 20 μPa;

a preamplifier with gain of 40 dB.

The fourth element that is part of the SNR calculation is the level of noise at the receiver, which for a typical hydrophone is equal to −164 dBV/√Hz @ 1 kHz. A plausible maximum band extension of the useful signal (see method 1) is around 200 Hz.

Therefore the level of noise that is added to the useful signal is $20 \log_{10}[10^{(-164+40)/20} \sqrt{200}] = -101$ dBV.

By using the four elements now processed, it is possible to calculate the SNR:

$$SNR=(117-64-174+40)-(-101)=20 \text{ dB}.$$

In these conditions the signal is still revealable, possibly by carrying out a suitable post-processing (for example stacking) so as to further reduce the effect of the noise.

Figure 7:
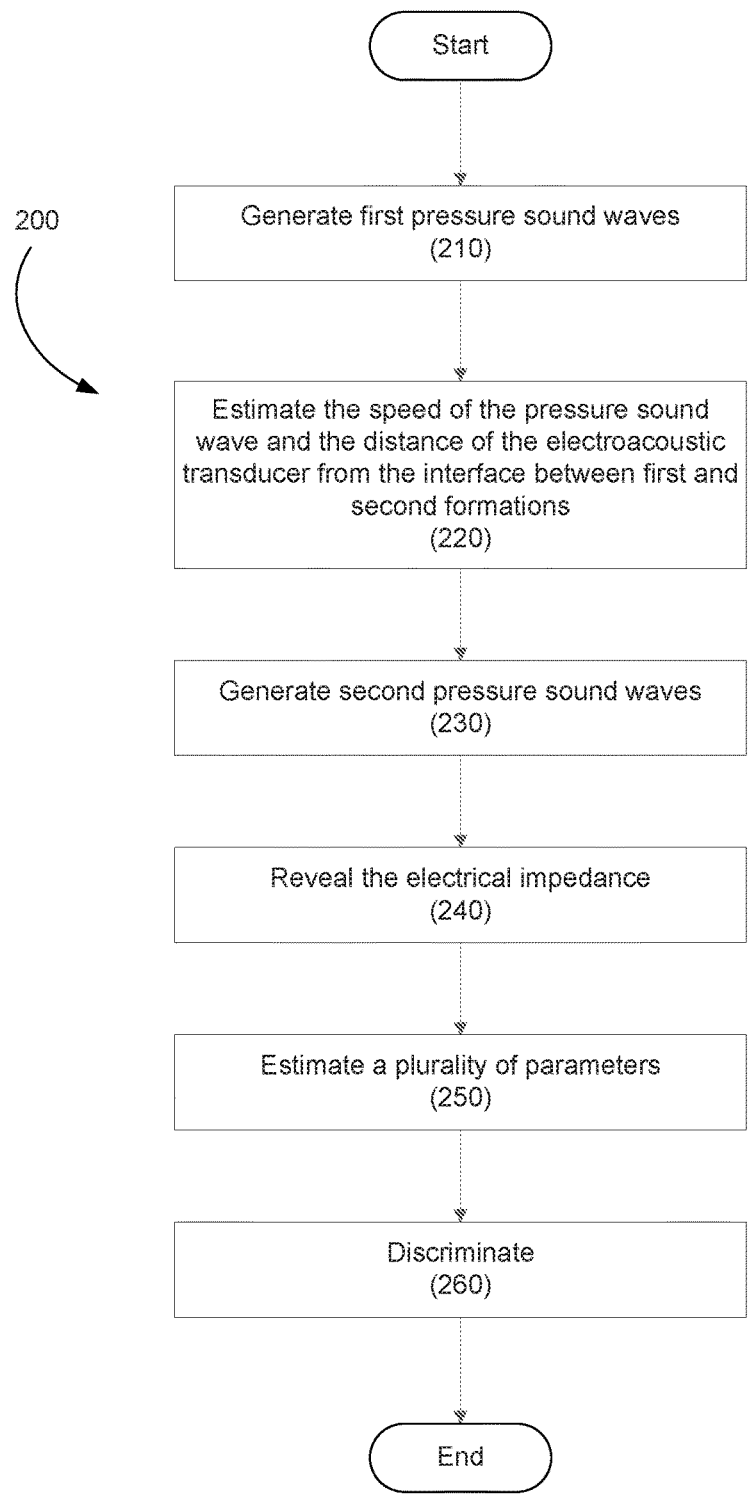
FIG. 7 is a flowchart illustrating a method according to an embodiment of the present disclosure.

The method 200 (shown in FIG. 7) implemented by the system 100 for revealing anomalous discontinuity interfaces in pore pressures in non-drilled geological formations is as follows.

The generator of the pilot signal 31 of the electronic processing unit 30 sends a pilot signal to the driving means 34 of the transmitter 21.

The transmitter 21 generates (phase 210) first pressure sound waves in the direction of the axis A of the electroacoustic transducer 20 that are reflected back to the receiver 22 by the discontinuities in soil, wherein by discontinuity in the ground we mean the passage interfaces 50 between two formations 51, 52 that are different in terms of lithology and/or of pore pressure.

On the basis of the reflected signals received by the receiver 22, the electronic processing unit 30 estimates (phase 220) the speed of the pressure sound wave generated and the distance between the electroacoustic transducer 20 and the first discontinuity interface 50 between a first 51 and a second 52 formation present along the transmission direction A of the pressure sound wave, inside a large revealing range in general up to around 10 m.

The revealing depth is related to the frequency range used for generating the sound waves that usually goes from 100 Hz to a few kHz, wherein such a range generally comprises the frequency range in which the dispersive behaviour of the waves is greater.

Subsequently, the transmitter 21 generates (phase 230) second pressure sound waves in the direction of the axis A of the electroacoustic transducer 20.

The electronic processing unit 30 then reveals (phase 240) the electrical impedance induced at the terminals of the electroacoustic transducer 20 to then estimate (phase 250) a plurality of parameters characteristic of the two formations 51, 52 across the discontinuity interface 50 revealed so as to discriminate (phase 260) whether the anomaly arisen from the previous phase (phase 220) was due or not to the presence of a formation in overpressure. As an alternative, the anomaly revealed could be due for example to a change of lithology.

Indeed from the effects induced on electric impedance of the electroacoustic transducer 20 by the presence of fluid in the formation, it is possible to derive the variation of the speed of the pressure sound wave according to the frequency of the pilot signal inside the formation for which an anomaly was previously revealed (phase 220).

The generation phase of first pressure sound waves (phase 210) preferably comprises the generation of a continuous chirp, i.e. a linear sweep frequency (FMCW, Frequency Modulation Continuous Wave) or in other words a continuous signal whose frequency linearly increases in time.

The selection of such a signal is particularly advantageous since it makes the processing of the signal received more simple, therefore being able to be implemented in an analogical manner. In such a way it is ensured that there is no decrease of the signal resolution before the acquisition.

Moreover, for the same radiated energy, it is possible to operate at smaller driving voltages, since such a signal requires a lower transmission power peak.

Finally, it is ensured, for the same depth of the discontinuity interface 50, a better signal/disturbance ratio at the receiver 22, since the band of the useful signal is smaller and the noise energy is consequently smaller.

Figure 5:
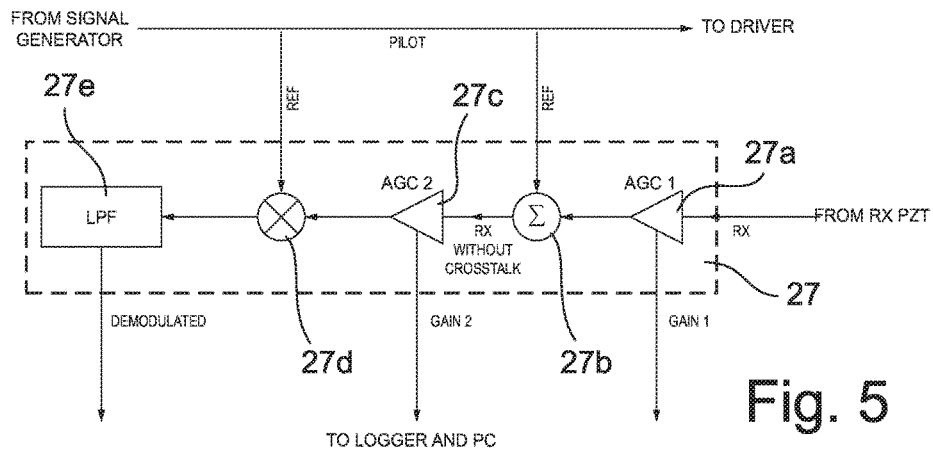
FIG. 5 is a schematic representation of the processing means comprised in the sound receiver.

The estimation step (phase 220) based upon the signals at the terminals of the sound receiver 22 comprises a first conditioning phase of the analogical signal at the terminals of the receiver 22, schematically shown in FIG. 5, comprising the phases consisting of:

amplifying and equalizing the signal at the terminals of the receiver 22 with the amplitude level of the pilot signal transmitted to the transmitter 21 (phase 221) through a first automatic gain control circuit 27a;

subtracting (phase 222) the pilot signal transmitted to the transmitter 21 from the signal at the terminals of the receiver 21 by means of a subtractor circuit 27b, for further attenuating the crosstalk component that is ideally the same as the piloting signal;

amplifying (phase 223) the signal with the crosstalk component taken away and equalizing it at the same amplitude level as the pilot signal transmitted to the transmitter 21, through a second automatic gain control circuit 27c;

multiplying (phase 224) the signal resulting from the amplification phase for the pilot signal transmitted to the transmitter 21 through a multiplier circuit 27d;

filtering (phase 225) the multiplied signal by means of a low-pass filter 27e, like for example a Bessel filter of the $4^{th}$ order, to extract the low-frequency component (beat frequency $f_B$).

On the basis of the beat frequency $f_B$ thus obtained the speed v1 of the sound wave in the first formation 51 is estimated (phase 226)—which is almost constant in frequency since the first formation is presumed to be normally pressurised- and the depth of the potential discontinuity interface 50 (sharp or gradual) between the first 51 and the second 52 formation is calculated. Indeed, the beat frequency $f_B$ is proportional to the "travel time" τ needed for the pressure wave to propagate from the transmitter 21 to the discontinuity interface 50 and to return back to the receiver 22, through the frequency range ΔF used and the duration T of the pressure sound wave transmitted by the transmitter 21. In formula, $$\tau = f_B \frac{T}{\Delta F}.$$

Figure 4A:
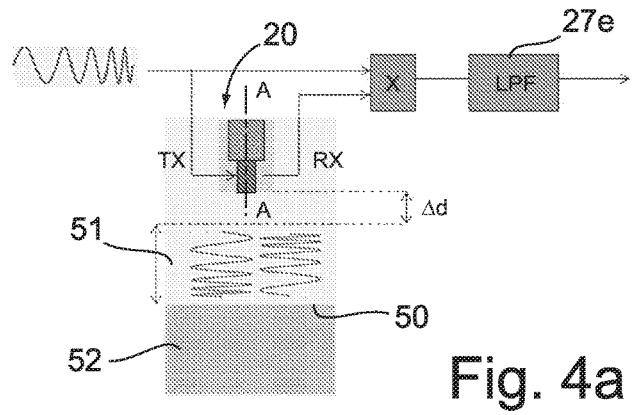
FIGS. 4A and 4B are schematic representations of a first measuring phase of the method for identifying anomalous discontinuity interfaces in pore pressures in non-drilled geological formations.
Figure 4B:
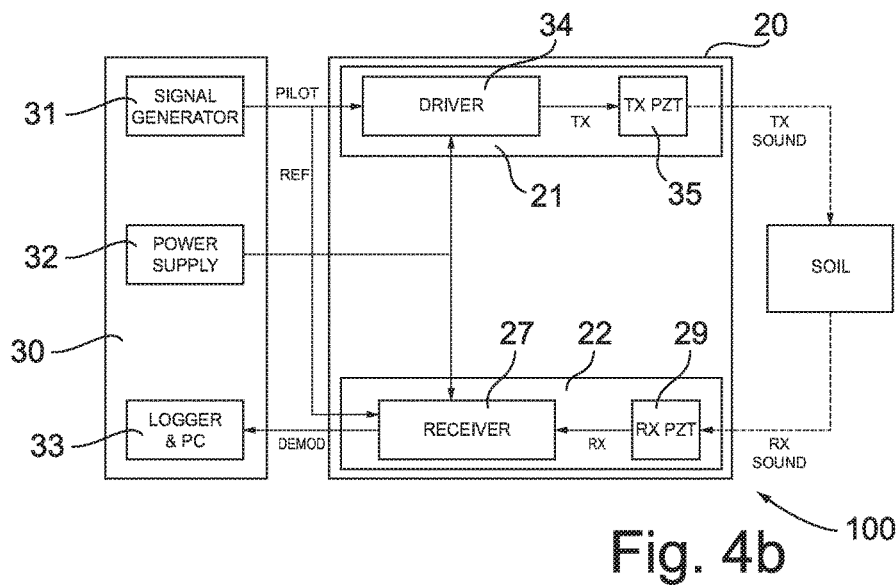

As indicated in FIG. 4A, it is necessary to carry out at least two travel time measurements $\tau_A$ and $\tau_B$ in two positions A and B at a known distance $\Delta d$ in order to estimate the speed of the sound wave v1 in the first formation 51, through the formula $$v_1 = \frac{2\Delta d}{\tau_A - \tau_B}$$

and, on the basis of such a speed v1, determine the distance d of the electroacoustic transducer 20 and therefore of the bit 10 from the interface 50 with the second formation 52 possibly at a different pressure, through the formula $$d = \frac{v_1 \tau_B}{2}.$$

The generation phase of second pressure sound waves (phase 230) preferably comprises the generation of continuous single-tone signals in the frequency band of interest as pilot signals.

Figure 6A:
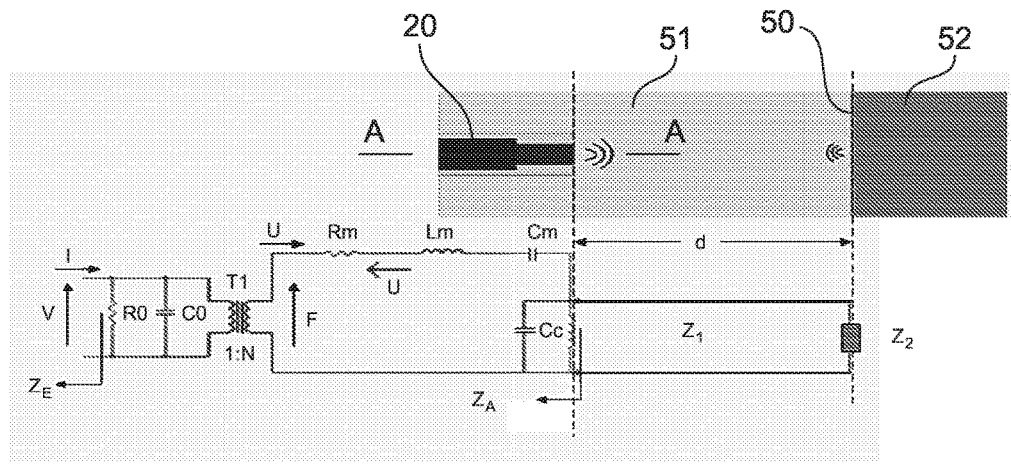
FIGS. 6A and 6B are schematic representations of a second measuring phase of the method for identifying anomalous discontinuity interfaces in pore pressures in non-drilled geological formations.
Figure 6B:
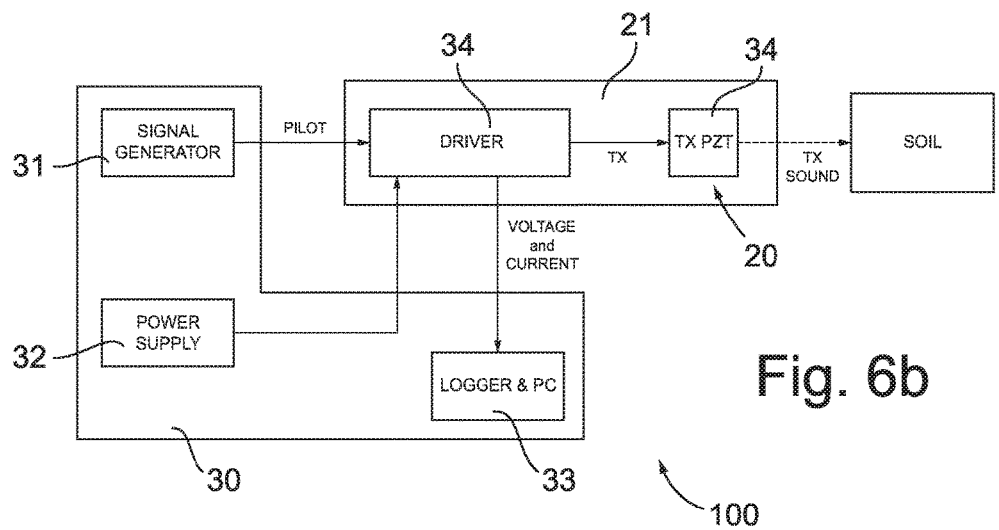

The estimation step (phase 250) of a plurality of parameters characteristic of the two formations 51, 52 across the discontinuity interface 50 on the basis of the electrical impedance induced at the terminals of the electroacoustic transducer 20, obtained from the revealing phase (phase 240), refers to a theoretical model of the transducer 20 and to the formations 51,52 described in the rest of the description and illustrated in FIG. 6A.

Theoretical Model of the Transducer:

The electroacoustic transducer 20 is described by an electromechanical model, i.e. an electrical circuit with components selected by using the analogies between electrical domain and mechanical domain.

Such a circuit is "loaded" with a radiation impedance $Z_{rad}$ which, as described in relation to the system 100, depends upon the acoustic properties of both the formations (both the first on which the electroacoustic transducer 20 rests, and the second), upon the depth d of the interface 50 between the two formations 51, 52 and upon the ratio between the size (diameter D) of the radiating surface of the transmitter 21 and the sound wavelength $\lambda$ in the first formation.

Specifically, the relation between $Z_E$ and $Z_{rad}$ is defined by the following equations:

$$Y_E = \frac{1}{R_0} + j\omega C_0 + \frac{N^2}{R_m + j\omega L_m + \frac{1}{j\omega C_m} + \frac{Z_{rad}}{1 + j\omega C_c Z_{rad}}}$$

$$Z_E = \frac{1}{Y_E}$$

In such a way, the radiation impedance $Z_{rad}$ can be obtained through a measurement of the overall electrical impedance $Z_E(\omega)$ at the terminals of the transmitter 21. Such an impedance can be measured directly from the ratio between the voltage V and current I measurements at the terminals of the transmitter 21.

The radiation impedance $Z_{rad}$ is moreover related to the overall acoustic impedance $Z_A \omega$ "seen" by the transmitter looking towards the formation 21 according to the following equation:

$$Z_{rad} = Z_A \left\{ \pi a^2 \left[ 1 - \frac{J_1(2k_1 a)}{k_1 a} \right] + j \frac{\pi}{2k_1^2} K_1(2k_1 a) \right\} + \frac{2E_1 a}{jk_1 v_1(1 - v_1^2)}$$

Formation Model:

The formation, being in general a poroelastic medium, is preferably modelled as an acoustic lossy transmission line with length equal to the depth d of the interface 50 between the two formations 51, 52 (model with a single plane wave).

In alternative embodiments it is possible to use a model that considers a more complex propagation, or rather not a single plane wave.

The acoustic transmission line has a first characteristic impedance $Z_1$ of the formation 51—supposed at normal pressure—in which the drilling bit 10 lies, and terminates with a load that is equal to a second characteristic impedance $Z_2$ of the formation 52 in possible overpressure.

Therefore the acoustic impedance $Z_A(\omega)$ is in turn related to the impedances $Z_1$ and $Z_2$ according to the following equations:

$$Z_A = Z_1 \frac{e^{\alpha_1 d} e^{jk_1 d} + r e^{-\alpha_1 d} e^{-jk_1 d}}{e^{\alpha_1 d} e^{jk_1 d} - r e^{-\alpha_1 d} e^{-jk_1 d}} \quad r = \frac{Z_1 - Z_2}{Z_1 + Z_2}$$

wherein the distance d of the transducer from the discontinuity interface 50 is obtained by the estimation and calculation step (phase 226) shown in detail above.

In general, the characteristic impedance of a formation can be expressed in terms of density, velocity and attenuation through the formula:

$$Z_i = \rho_i v_i \frac{1 + j\frac{\alpha_i v_i}{\omega_i}}{1 + \frac{\alpha_i^2 v_i^2}{\omega_i^2}} \quad i = 1, 2$$

Where the density $\rho$, attenuation $\alpha$ and sound speed v parameters can be found from known rock physics models. According to such models, the acoustic dispersion of the formation can detect the presence of overpressures of the formation.

This occurs when the sound speed v depends strongly upon the frequency and the attenuation $\alpha$ is particularly marked, becoming a characteristic impedance Z of formations that is complex and dependent upon the frequency.

In exemplifying terms, a first physical model of the rocks (model of the poroelastic medium developed by Biot) models the frequency trends of in attenuation and sound speed through a plurality of parameters that can be attributed to the following four:

low-frequency limit rate $v_0$;
high-frequency limit rate $v_\infty$;
density of the biphasic medium $\rho$; and
characteristic frequency $\omega_C$;

where the subscripts "0" and "∞" indicate the limit values at low (around 10 Hz) and high frequency (around 10 kHz), respectively, and the characteristic frequency $\omega_C$ depends upon the viscosity of the fluid in the pores and upon the configuration of the pores themselves.

One possible description of the sound dispersion in the ground in presence of geopressures based upon the aforementioned parameters is given by a model made up of the following equations (DM—Dispersive model):

$$v(\omega) = \frac{v_0 v_\infty \sqrt{1 + \left(\frac{\omega}{\omega_C}\right)^2}}{\sqrt{v_\infty^2 + v_0^2 \left(\frac{\omega}{\omega_C}\right)^2}}, \quad \alpha(\omega) = Q^{-1}(\omega) \frac{\omega}{2v(\omega)},$$

$$Q^{-1}(\omega) = \frac{(v_\infty^2 - v_0^2)\frac{\omega}{\omega_C}}{v_0 v_\infty \left[1 + \left(\frac{\omega}{\omega_C}\right)^2\right]}$$

From such a model it can be worked out that as the effective pressure decreases, equal to the difference between lithostatic pressure (constant), also known as overburden pressure, and the pressure at the pores:
the sound speed decreases;
the variation in frequency $v_\infty - v_0$ of the sound speed increases; and
the inverse Q-factor, and thus the attenuation proportional to it, increases.

In substance, from the electrical impedance $Z_E(\omega)$ obtained through the measurement of the voltage V and of the current I measured at the terminals of the transmitter 21 (phase 240) it is possible to obtain a suitable set of parameters (phase 250) characterising the two formations across the discontinuity interface 50.

According to a first embodiment, the parameters obtained by the electrical impedance $Z_E(\omega)$ are, for both the formations 51,52:
the low-frequency limit rate ($v_{01}, v_{02}$);
the high-frequency limit rate ($v_{\infty 1}, v_{\infty 2}$);
the density of the biphasic medium ($\rho_1, \rho_2$); and
the characteristic frequency ($\omega_{C1}, \omega_{C2}$).

As an alternative, the parameters obtained by the electrical impedance $Z_E(\omega)$ are:
the sound speed in the second formation ($v_2$);
the density ($\rho_1, \rho_2$) of the two formations (constant as the frequency varies);
the attenuation in the second formation ($\alpha_2$);

Such a set of alternative parameters is estimated for each frequency in the band of interest.

In particular, it should be considered that the sound speed $v_1$ in the first medium—constant as the frequency varies since it is relative to an assumed non dispersive medium—is that which is obtained in the estimation and calculation step (phase 226) described in detail above, and therefore the attenuation $\alpha_1$ in the first formation 51 can be approximated to zero. Indeed, in the band of interest, the attenuation effect in one non dispersive layer at the most 10 meters thick can be considered negligible.

In such a second alternative it is necessary to repeat the phases of generation (phase 230) of second pressure sound waves and of measurement (phase 240) of the electrical impedance $Z_E(\omega)$ in at least two different positions.

In both the alternatives, the inversion of the model for estimating the interest parameters starting from the electrical impedance $Z_E(\omega)$ measured (phase 240) and from the results obtained from the estimation and calculation step (phase 220) or rather the sound speed $v_1$ in the first formation 51 and the distance d of the transducer 20 from the discontinuity interface 50 can be carried out in the following alternative manners:
the parameters of the model are adjusted until a good adherence is obtained between the electrical impedance $Z_E(\omega)$ measured and the "synthetic" electrical impedance predicted by a forward model; or
a least squares estimation is carried out, on the basis of the electrical impedance $Z_E(\omega)$ values measured and starting from a suitable guess for the set of parameters. For such a purpose it is possible to use a suitable algorithm, like for example the Levenberg-Marquardt algorithm.

The phase (phase 260) for estimating whether the anomaly revealed is due or not to the presence of a formation in overpressure, provides estimating the pressure at the pores in the second formation 52 according to two possible methods:
comparing the parameters characteristic of the two formations 51,52 obtained in the estimation step (phase 250) with a set or database of parameters obtained preemptively characterising in a laboratory rock samples at different pressures;
using a suitable rock physics model that relates the characteristic parameters of the formations 51,52 obtained in the estimation step (phase 250) with the pore pressure of the relative formation.

According to the set of parameters obtained by the electrical impedance $Z_E(\omega)$ (phase 250) as outlined above, the parameters for characterising the rocks obtained by sample measurements are alternatively:
the low-frequency limit speed $v_0$;
the high-frequency limit speed $v_\infty$;
the density of the biphasic medium $\rho$; and
the characteristic frequency $\omega_C$;
or
the profile in frequency of the sound speed;
the profile in frequency of the attenuation;
the density (constant as the frequency varies).

From the description made the characteristics of the method and of the system for revealing anomalous discontinuity interfaces in pore pressures in non-drilled geological formations object of the present invention are clear, just as the relative advantages should also be clear.

Indeed, despite strict requirements imposed on the electroacoustic transducer, the particular system makes it possible to reveal the position of a discontinuity interface in front of the bit with a prediction resolution in the order of a meter.

Moreover, the innovative processing methods of the signals revealed make it possible to estimate the pressure downstream of the revealed discontinuity interface with certain precision, thus making it possible to determine whether the discontinuity revealed is attributable or not to the presence of overpressure.

It is finally clear that the system thus conceived can undergo numerous modifications and variants, all covered by the invention; moreover, all the details can be replaced by technically equivalent elements. In practice the materials used, as well as the dimensions can be any according to the technical requirements.

The invention claimed is:
1. A method for revealing anomalous discontinuity interfaces in pore pressures in non-drilled geological formations, comprising:
generating, by an electroacoustic transducer, first pressure sound waves in a direction of an axis of the electroacoustic transducer and receiving a reflected signal of the first pressure sound waves generated by at least one discontinuity interface due to passage from a first to a second different geological formation, situated successively along an emission direction of the electroacoustic transducer;

on the basis of the reflected signal received, calculating speed of the first pressure sound waves generated and a distance between the electroacoustic transducer and the at least one discontinuity interface;

generating, by the electroacoustic transducer, second pressure sound waves in the direction of the axis of the electroacoustic transducer and revealing electrical impedance induced at terminals of the electroacoustic transducer;

on the basis of the electrical impedance revealed, estimating a plurality of parameters characteristic of the first and the second geological formation; and on the basis of sound speed and the distance calculated and the plurality of characteristic parameters estimated, estimating pressure of the second geological formation.

2. The method for revealing anomalous discontinuity interfaces in pore pressures in non-drilled geological formations according to claim 1, wherein the generating the first pressure sound waves comprises generating a continuous signal whose frequency with time is varied.

3. The method for revealing anomalous discontinuity interfaces in pore pressures in non-drilled geological formations according to claim 1, wherein the calculating on the basis of the reflected signal received comprises an analogical conditioning phase of the reflected signal received comprising:

amplifying and equalizing the reflected signal received with an amplitude level of a pilot signal transmitted to the electroacoustic transducer for generation of the first pressure sound waves;

subtracting the pilot signal from the reflected signal received;

amplifying the signal resulting from the subtraction and equalizing it with the amplitude level of the piloting signal;

multiplying the signal resulting from the amplification by the piloting signal; and filtering the multiplied signal and extracting the beat frequency of the signal.

4. The method for revealing anomalous discontinuity interfaces in pressures in non-drilled geological formations according to claim 1, wherein the calculating on the basis of the reflected signal received comprises:

making at least two travel time measurements ($\tau_A$, $\tau_B$) necessary for the first sound waves for propagating from the electroacoustic transducer to the discontinuity interface and returning to the electroacoustic transducer in two positions at a known distance ($\Delta d$);

calculating the sound speed on the basis of the two travel time measurements ($\tau_A$, $\tau_B$) and the known distance according to equation $$v_1 = \frac{2\Delta d}{\tau_A - \tau_B};$$

and calculating the distance (d) between the electroacoustic transducer and the at least one discontinuity interface on the basis of the sound speed according to equation $$d = \frac{v_1 \tau_B}{2}.$$

5. The method for revealing anomalous discontinuity interfaces in pore pressures in non-drilled geological formations according to claim 4, wherein the travel time measurement ($\tau_A$, $\tau_B$) is effected on the basis of the beat frequency determined in the filtering according to equation $$\tau = f_B \frac{T}{\Delta F}$$

wherein $\Delta F$ is the frequency range and T is the duration of the first pressure sound waves.

6. The method for revealing anomalous discontinuity interfaces in pore pressures in non-drilled geological formations according to claim 1, wherein the generating the second pressure sound waves comprises generating continuous single-tone signals in the frequency band of interest.

7. The method for revealing anomalous discontinuity interfaces in pore pressures in non-drilled geological formations according to claim 1, wherein the electrical impedance is linked to the plurality of parameters characteristic of the first and the second geological formation according to a model described by following equations:

$$\begin{cases} \frac{1}{Z_E} = \frac{1}{R_0} + j\omega C_0 + \cfrac{N^2}{R_m + j\omega L_m + \cfrac{1}{j\omega C_m} + \cfrac{Z_{rad}}{1 + j\omega C_c Z_{rad}}} \\ Z_{rad} = Z_A \left\{ \pi a^2 \left[1 - \frac{J_1(2k_1 a)}{k_1 a}\right] + j\frac{\pi}{2k_1^2} K_1(2k_1 a) \right\} + \frac{2E_1 a}{jk_1 v_1(1-v_1^2)} \\ Z_A = Z_1 \frac{e^{\alpha_1 d} e^{jk_1 d} + re^{-\alpha_1 d} e^{-jk_1 d}}{e^{\alpha_1 d} e^{jk_1 d} - re^{-\alpha_1 d} e^{-jk_1 d}}, \quad r = \frac{Z_1 - Z_2}{Z_1 + Z_2} \\ Z_i = \rho_i v_i \frac{1 + j\frac{\alpha_i v_i}{\omega_i}}{1 + \frac{\alpha_i^2 v_i^2}{\omega_i^2}} \quad i = 1, 2 \\ v_i(\omega) = \frac{v_{0i} v_{\infty i} \sqrt{1 + \left(\frac{\omega}{\omega_{Ci}}\right)^2}}{\sqrt{v_{\infty i}^2 + v_{0i}^2 \left(\frac{\omega}{\omega_{Ci}}\right)^2}}, \quad \alpha_i(\omega) = Q_i^{-1}(\omega) \frac{\omega}{2v_i(\omega)}, \\ Q_i^{-1}(\omega) = \frac{(v_{\infty i}^2 - v_{0i}^2)\frac{\omega}{\omega_{Ci}}}{v_{0i} v_{\infty i} \left[1 + \left(\frac{\omega}{\omega_{Ci}}\right)^2\right]} \end{cases}$$

8. The method for revealing anomalous discontinuity interfaces in pore pressures in non-drilled geological formations according to claim 1, wherein the plurality of parameters characteristic of the first and the second geological formation estimated in the estimating comprises:

the low-frequency limit speed ($v_{01}$, $v_{02}$);
the high-frequency limit speed ($v_{\infty 1}$, $v_{\infty 2}$);
the density of the biphasic medium ($\rho_1$, $\rho_2$); and
the characteristic frequency ($\omega_{C1}$, $\omega_{C2}$).

9. The method for revealing anomalous discontinuity interfaces in pore pressures in non-drilled geological formations according to claim 1, wherein the plurality of parameters characteristic of the first and the second geological formation estimated in the estimating comprises, for each frequency analyzed in the band of interest:

the sound speed ($v_1$, $v_2$);

the density ($\rho_1, \rho_2$); and
the attenuation ($\alpha_1, \alpha_2$);
wherein
the generating the second pressure sound waves and the detecting the electrical impedance are repeated in at least two different positions;
the sound speed in the first medium is assumed as being constant with a variation in the frequency and equal to that obtained in the calculating; and
the attenuation is approximated to zero.

10. The method for revealing anomalous discontinuity interfaces in pore pressures in non-drilled geological formations according to claim 1, wherein the estimating the pressure of the second geological formation comprises comparing the plurality of characteristic parameters of the first and second geological formation with a set of characterization parameters of rocks at different pressures previously collected by laboratory measurements.

11. The method for revealing anomalous discontinuity interfaces in pore pressures in non-drilled geological formations according to claim 1, wherein the estimating the pressure of the second geological formation comprises using a rock physics model which correlates the plurality of characteristic parameters of the first and second geological formation with the pore pressure of the relative formation.

* * * * *